United States Patent
Kato et al.

(10) Patent No.: US 7,193,010 B2
(45) Date of Patent: Mar. 20, 2007

(54) AQUEOUS RESIN COMPOSITION, AND METHOD OF MANUFACTURING A SEPARABLE FASTENER USING THIS COMPOSITION

(75) Inventors: Mitsuru Kato, Okayama Pref. (JP); Yukitoshi Higashinaka, Fukui-Pref. (JP)

(73) Assignee: Kuraray Co., Ltd., Kurashiki (JP)

( * ) Notice: Subject to any disclaimer, the term of this patent is extended or adjusted under 35 U.S.C. 154(b) by 312 days.

(21) Appl. No.: 10/671,455

(22) Filed: Sep. 29, 2003

(65) Prior Publication Data

US 2004/0059051 A1 Mar. 25, 2004

Related U.S. Application Data

(63) Continuation of application No. 10/059,410, filed on Jan. 31, 2002, now abandoned.

(30) Foreign Application Priority Data

| Jan. 31, 2001 | (JP) | ............................. 2001-022797 |
| Feb. 22, 2001 | (JP) | ............................. 2001-046084 |
| Jun. 18, 2001 | (JP) | ............................. 2001-183140 |

(51) Int. Cl.
- *A44B 18/00* (2006.01)
- *B05D 3/02* (2006.01)
- *C08K 3/20* (2006.01)
- *C08L 33/02* (2006.01)
- *C08L 75/04* (2006.01)

(52) U.S. Cl. .................. 524/591; 24/445; 24/448; 24/450; 427/389.9; 523/406; 523/415; 525/111; 525/123; 525/453; 525/454; 525/455

(58) Field of Classification Search .................. None
See application file for complete search history.

(56) References Cited

U.S. PATENT DOCUMENTS

| 4,948,829 | A | 8/1990 | Mitsuji et al. ............... 524/457 |
| 5,011,881 | A | 4/1991 | Fujii et al. ................... 524/457 |
| 5,231,738 | A | 8/1993 | Higashinaka ................ 24/446 |
| 5,369,852 | A | 12/1994 | Higashinaka ................ 24/446 |
| 5,473,800 | A | 12/1995 | Hatomoto et al. ............ 24/442 |
| 5,515,583 | A | 5/1996 | Higashinaka ................ 24/446 |
| 6,156,840 | A | 12/2000 | Nakamae et al. ........... 524/839 |
| 6,322,851 | B1 | 11/2001 | Adachi et al. .............. 427/246 |
| 6,479,153 | B1 | 11/2002 | Kato et al. ................ 428/423.7 |

FOREIGN PATENT DOCUMENTS

| EP | 0 426 359 | 5/1991 |
| EP | 0 735 069 | 10/1996 |
| EP | 0 739 069 | 10/1996 |
| JP | 62-112504 A | * 5/1987 |
| JP | 8-259884 | 10/1996 |
| JP | 10-226719 A2 | 8/1998 |
| JP | 10-265539 A | 10/1998 |
| JP | 10-273587 A2 | 10/1998 |
| JP | 10-298251 A | 11/1998 |
| JP | 11-171956 A | 6/1999 |
| JP | 11-279950 | 10/1999 |

OTHER PUBLICATIONS

Chemical Abstracts Accession No. 1999:773811 for Zeng, et al.,. "Comparison Between Main Properties of Polyurethane Dispersion Based on DMBA and DMPA", Pige Huagong (1999), vol. 16, No. 5, pp. 19-22.
Jun, Zeng, "Comparison Between Main Properties of Polyurethane Dispersions Based on DMBA and DMPA", (1999) 16(5), pp. 19-22 (with English translation).

* cited by examiner

*Primary Examiner*—Robert Sellers
(74) *Attorney, Agent, or Firm*—Oblon, Spivak, McClelland, Maier & Neustadt, P.C.

(57) ABSTRACT

An aqueous resin composition satisfying the following criteria (I)–(III). (I) The aqueous resin composition contains (a) an aqueous dispersion of a polyurethane resin obtained from a macromolecular polyol, organic polyisocyanate, chain extending agent and 2,2-dimethylolbutanoic acid, and, if required, (b) an aqueous dispersion of an acrylic resin. (II) When the resin comprising this aqueous resin composition contains mainly a polyurethane resin, the inherent viscosity ($\eta_{inh}$) of the polyurethane resin measured at a concentration of 0.5 g/dL in dimethylformamide solution is in the range of 0.2–0.7 dL/g. After this aqueous resin composition is dried, the elastic modulus at 25° C. of the film obtained by heat treatment at 80° C. for 8 hours is in the range of $8.0 \times 10^6$–$5.0 \times 10^8$ Pa, and the elastic modulus at 80° C. is $8.0 \times 10^7$ Pa or less. When this aqueous resin composition is used to treat fibrous sheets, it gives fibrous products having excellent performance and durability without any problem regarding safety, hygiene or pollution, and, when it is used as a back coating resin for a separable fastener, a separable fastener is obtained having excellent resistance to fiber dropout in washing and resistance to chlorine bleaching agents, together with good durability over very long periods of use.

27 Claims, No Drawings

AQUEOUS RESIN COMPOSITION, AND METHOD OF MANUFACTURING A SEPARABLE FASTENER USING THIS COMPOSITION

This application is a Continuation application of U.S. application Ser. No. 10/059,410 filed on Jan. 31, 2002, now abandoned.

BACKGROUND OF THE INVENTION

1. Field of the Invention

This invention relates to an aqueous resin composition for processing fibrous sheets which presents no problem with regard to safety, hygiene or pollution, and to its use as the back coating of a separable fastener. A method of manufacturing a separable fastener having excellent characteristics using this composition is also a part of the invention.

2. Discussion of the Background

Separable fasteners known in the art typically comprise two types of sheets, i.e., one sheet having plural hook-shaped catches or mushroom-shaped projections (referred to hereafter as hooks) on the base fabric and the other sheet having plural loop-shaped connectors (referred to hereafter as loops) on the other base fabric, the two sheets being joined by the interconnection of the hooks and the loops. Other fasteners are known wherein hooks and loops are present on the same surface. These separable fasteners are widely used as closure devices.

To manufacture the separable fastener, the hooks (or the filaments for hooks) and the loops are interwoven in a fabric (sheet), an organic solvent solution or aqueous dispersion of a resin is coated on the back surface of the base fabric of the loops or hooks, i.e., the back surface of the base material of the separable fastener, to prevent them falling out due to repeated fastening and unfastening, and the separable fastener is then attached to cloth (woven or unwoven), leather or a plastic sheet such as PVC by sewing or sticking with adhesive, or by high frequency adhesion.

The coating resin was usually a resin such as polyurethane, polyester or polyamide, polyurethane resin being the most widely used due to its high performance.

The polyurethane resin used as the back coating of the separable fastener was in the form of an organic solvent solution or an aqueous dispersion. In the case of an organic solvent solution, there were major problems regarding safety, hygiene and pollution. On the other hand, in an aqueous dispersion, the hydrophilic nature of the polyurethane resin is much stronger than in an organic solvent solution, and the performance of the separable fastener is considerably impaired. For this reason, considering the performance of the separable fastener, organic solvent solutions of polyurethane resin are still being used. In recent years, however, environmental pollution has become a major issue, and a manufacturing method which did not use an organic solvent was much desired.

For example, in Japanese Patent Laid-Open 62-112504, a method is disclosed for manufacturing a separable fastener using an aqueous dispersion of a polyurethane resin wherein the washability and dry cleaning properties, which were formerly problems with aqueous dispersions, are improved. However, in the invention of this disclosure, there is no mention of improvement of deterioration due to chlorine bleaching agents used for separable fasteners on account of their recent, wide use in medical applications in hospitals, or seat covers in automobiles, trains and aeroplanes. The chlorine bleaching agent is usually an aqueous solution of sodium hypochlorite, but as polyurethane resin has a highly hydrophilic nature in aqueous dispersion, it is easily degraded by chlorine bleaching agents. Consequently, the separable fastener obtained using the aqueous dispersion of polyurethane resin in this disclosure as a back coating tends to become ruffled due to the chlorine bleaching process, and its durability is considerably impaired. In the disclosure cited, the improvement of ruffling due to fastening and unfastening after washing (washability) is mentioned. However, better characteristics are now being required concerning also the dropout of fibers from the edges of the separable fastener when it is subjected to stirring in a washing machine, and there is no mention of any method to improve this point. Still further, in the case of separable fasteners having an aqueous dispersion polyurethane resin as a back coating, the phenomenon of crease whitening, wherein a part of the separable fastener which becomes creased shows a white line, tends to occur more easily than in the case of a solvent system, and there is no measure proposed to deal with this problem in the disclosure cited. For this reason, polyurethane organic solvent solutions are still being used for the back coating agent. However, in recent years, attention has been focused on environmental pollution. If back coating agents based on organic solvents are used for the fasteners, the organic solvents are necessarily released into the atmosphere by evaporation and diffusion, and this leads to environmental pollution. It was thus much desired to manufacture the fasteners without using organic solvents.

In the case of fibrous sheets other than separable fasteners, it is common practice to impregnate or coat the sheet with a resin to impart physical properties, improve appearance or confer functionality, and here too, the avoidance of organic solvents was much desired to preserve the environment and maintain safety.

SUMMARY OF THE INVENTION

It is therefore an object of this invention to provide an aqueous resin composition for use with fibrous sheets which presents no problem with regard to safety, hygiene or pollution. It is a further object of this invention to provide a separable fastener using this composition wherein the component fibers are firmly fixed, there is little ruffling when the fastener is washed and very little ruffling due to bleaching with chlorine, and the fastener is highly durable over a long period of time showing no dropout of fibers from the edges of the fastener due to washing (hereafter, respectively referred to as washability, resistance to chlorine bleaching agents and absence of fiber dropout in washing), and the fastener also has the excellent ability of not whitening due to creasing.

As a result of intensive studies to resolve the above problems, the inventors arrived at the present invention. Specifically, this invention is an aqueous resin composition for processing fibrous sheets satisfying the following conditions (I)–(III).

(I) The composition mainly comprises (a) an aqueous dispersion obtained using a macromolecular polyol, an organic polyisocyanate, a chain extending agent and 2,2-dimethylolbutanoic acid as essential raw materials, and if required, (b) an aqueous dispersion of an acrylic resin.

(II) When the resin comprising this aqueous resin composition is only polyurethane resin, the inherent viscosity ($\eta_{inh}$) of the polyurethane resin measured at a concentration of 0.5 g/dL in dimethylformamide solution is in the range of 0.2–0.7 (dL/g).

(III) After this aqueous resin composition is dried, the elastic modulus at 25° C. of the film obtained by heat processing at 80° C. for 8 hours is in the range of $8.0 \times 10^6$ Pa–$5.0 \times 10^8$ Pa and the elastic modulus at 80° C. thereof is not greater than $8.0 \times 10^7$ Pa.

According to this invention, a separable fastener is mentioned as a good example of a fibrous sheet to which the aqueous resin composition can be applied. In other words, if the aqueous resin composition of this invention is used as the back coat of a separable fastener, the aforesaid problems inherent in separable fasteners of the prior art can be resolved.

DETAILED DESCRIPTION OF THE INVENTION

This invention will now be described in further detail.

The composition mainly comprises (a) an aqueous dispersion obtained using a macromolecular polyol, organic polyisocyanate, chain extending agent and 2,2-dimethylolbutanoic acid as essential raw materials, and if required, (b) an aqueous dispersion of an acrylic resin (Condition (I)).

The inclusion in the aqueous resin composition of this invention of (c) a water-soluble or water-dispersible curing agent having at least two functional groups in the molecule capable of reacting with carboxyl groups, gives fibrous sheets treated by the composition even higher durability and is therefore preferred.

It is preferred that the resin component of the aqueous resin composition comprises 20 wt % to 100 wt % of a polyurethane resin and 80 wt % to 0 wt % of an acrylic resin. When the proportion of polyurethane resin is less than 20 wt %, the fiber dropout due to washing when the composition is used in a separable fastener is worse. It is more preferred that the weight proportion of polyurethane resin: acrylic resin is in the range 30:70–100:0.

It is preferred that the molecular weight of the macromolecular polyol comprising the polyurethane resin used in this invention lies in the range 500–3000, more preferred that it lies in the range of 600–2500, and still more preferred that it lies in the range of 700–2000. When the molecular weight is less than 500, resistance to chlorine bleaching agents when it is used in separable fasteners tends to be less, and when it is greater than 3000, white lines (known as crease whitening) occur easily when the separable fastener obtained is bent. The number average molecular weight of the macromolecular polyol referred to in this invention is the number average molecular weight computed based on the hydroxyl group value measured according to JIS K 1577 incorporated herein by reference.

The macromolecular polyol may be any of the macromolecular polyols known in the art. Examples are polyether polyols such as polyethylene glycol, polypropylene glycol, polytetramethylene glycol and poly (methyltetramethylene glycol); polyester polyols such as polybutylene adipate diol, polybutylene sebacate diol, poly hexamethylene adipate diol, poly (3-methyl-1,5-pentylene adipate) diol, poly(3-methyl-1,5-pentylene sebacate) diol, polycaprolactone diol and poly(β-methyl-δ-valerolactone) diol; polycarbonate polyols such as polyhexamethylene carbonate diol and poly (3-methyl- 1,5-pentylene carbonate) diol; and polyester carbonate polyols. It is preferred that one or more of these macromolecular polyols is used from the viewpoint of durability to ruffling, washability and dry cleaning properties when the composition is used for separable fasteners, with polytetramethylene glycol being particularly preferred.

There is no problem regarding use of the macromolecular polyol having more than 2 hydroxyl groups per molecule provided that it does not interfere with the synthesis of the aqueous dispersion of the polyurethane resin and the properties of the separable fastener obtained.

The organic polyisocyanate used in this invention may be any of the organic polyisocyanates used in the prior art for the manufacture of common polyurethane resins, preferred examples being selected from alicyclic diisocyanates, aliphatic diisocyanates and aromatic diisocyanates having a molecular weight not exceeding 500. Specific examples are hexamethylene diisocyanate, isophorone diisocyanate, 4,4'-dicyclohexylmethane diisocyanate, 2,4-tolylene diisocyanate, 2,6-tolylene diisocyanate, 4,4'-diphenylmethane diisocyanate, p-phenylene diisocyanate, xylylene diisocyanate and 1,5-naphthalene diisocyanate, and one, two or more of these compounds may be used. Of these, alicyclic diisocyanates such as isophorone diisocyanate or aliphatic diisocyanates such as hexamethylene diisocyanate may conveniently be used as they confer particular durability to ruffling and excellent washability when used for separable fasteners, with alicyclic diisocyanates being most preferred.

The chain extending component used in this invention may be any of the chain extending agents used in the prior art to manufacture common polyurethane, but low molecular weight compounds having a molecular weight of 300 or less and having at least two active hydrogen atoms in the molecule capable of reacting with isocyanate groups are preferred. Examples are diamines such as hydrazine, ethylene diamine, propylene diamine, hexamethylene diamine, nonamethylene diamine, xylylene diamine, isophorone diamine, piperazine and its derivatives, phenylene diamine, tolylene diamine, xylene diamine, adipic dihydrazide and isophthalic dihydrazide; triamines such as diethylene triamine; diols such as ethylene glycol, propylene glycol, 1,4-butanediol, 1,6-hexanediol, 1,4-bis(β-hydroxyethoxy) benzene, 1,4-cyclohexanediol, bis-(β-hydroxyethyl) terephthalate and xylene glycol; triols such as trimethylol propane; tetra-ols such as pentaerythritol; and aminoalcohols such as aminoethyl alcohol, aminopropyl alcohol, one, two or more of these compounds being used. Of these compounds, diamines such as hydrazine, ethylene diamine, piperazine, adipic dihydrazide and isophthalic dihydrazide may conveniently be used.

During the chain extending reaction, together with the chain extending agent having two or more functional groups, monoamines such as ethylamine, n-propylamine, i-propylamine, n-butylamine, i-butylamine, t-butylamine and cyclohexylamine; monoamine compounds containing a carboxyl group such as 4-aminobutanoic acid, 6-aminohexanoic acid, aminocyclohexane carboxylic acid and aminobenzoic acid; and monools such as methanol, ethanol, propanol and butanol may also be used in conjunction.

According to this invention, if the molar ratio of macromolecular polyol and chain extending agent used in the manufacture of the polyurethane resin is in the range of 1:0.5–1:20, the manufacture of the polyurethane resin is easily achieved and is therefore preferred. The molar ratio of macromolecular polyol to organic polyisocyanate is preferably in the range of 1:2–1:9, and the molar ratio of organic polyisocyanate to chain extending agent is preferably in the range of 1:0.1–1:0.9.

Regarding the aqueous dispersion of polyurethane resin (a) used in this invention, to emulsify and disperse the polyurethane resin in water, it is required that, after introducing carboxyl groups into the polyurethane resin skeleton using 2,2-dimethylolbutanoic acid, at least part of the carboxyl groups are neutralized by a tertiary amine. If a diol compound excepting 2,2-dimethylolbutanoic acid, e.g., 2,2-dimethylolpropionic acid, is used, there is less resistance to fiber dropout in washing, resistance to chlorine bleaching agents and resistance to crease whitening when the resin is used for separable fasteners.

In this invention, the reason why the performance of the separable fasteners is improved by using 2,2-dimethylolbutanoic acid is unclear, however it is thought to be due to the fact that, for example, 2,2-dimethylolbutanoic acid is more easily introduced uniformly into polyurethanes than 2,2-dimethylolpropionic acid and makes crosslinking reactions of the polyurethane resin more uniformly induced by the curing agent, and polyurethane resins using 2,2-dimethylolbutanoic acid tend to have a lower elastic modulus than when 2,2-dimethylolpropionic acid is used, so adherence to fibers is improved.

It is preferred that the amount of carboxyl groups in the polyurethane resin is 20 mmol to 60 mmol per 100 g of polyurethane resin, but more preferred that it is 25 mmol to 50 mmol per 100 g of polyurethane resin. When the amount of carboxyl groups is less than 20 mmol per 100 g of polyurethane resin, the water dispersion stability of the polyurethane resin is poorer and there is less resistance to crease whitening when the resin is used for separable fasteners, while when the amount of carboxyl groups exceed 60 mmol per 100 g of polyurethane resin, there tends to be poorer resistance to fiber dropout during washing, washability and resistance to chlorine bleaching agents when the resin is used for separable fasteners.

The tertiary amine used to neutralize the carboxyl groups may be at least one of a trialkylamine such as trimethylamine, triethylamine, methyl diethylamine or tripropylamine; an alkanoldialkylamine such as N, N-dimethylethanolamine, N, N-diethylethanolamine, N, N-diisopropylethanolamine and N, N-dimethylpropanolamine; or a dialkanolalkylamine such as N-methyldiethanolamine. Of these, at least one of triethylamine, N, N-dimethylethanolamine and N, N-diethylethanolamine is to be preferred.

From the viewpoint of the manufacturing stability of the aqueous dispersion of polyurethane resin, an addition amount of the tertiary amine of 0.3 to 1.5 mole times the carboxyl groups in the polyurethane resin is to be preferred, but 0.5 to 1.2 mole times is more preferred and 0.7 to 1.0 mole times is still more preferred.

The method of manufacturing the aqueous dispersion of polyurethane resin (a) used in this invention may be a method known in the art, there being no particular limitation. For example, at the same time as the terminal isocyanate prepolymer containing carboxyl groups obtained by reacting a macromolecular polyol, organic polyisocyanate and 2,2-dimethylolbutanoic acid is neutralized by a tertiary amine and emulsion-dispersed in water, or after it is emulsion-dispersed, its molecular weight is increased by a chain extending agent such as a polyamine. To make the emulsion dispersion easier, the terminal isocyanate prepolymer may be diluted in an organic solvent such as acetone, 2-butanone, toluene, ethyl acetate, tetrahydrofuran or dimethylformamide. Part or all of the chain extending agent may also be reacted before emulsification of the polyurethane.

Regarding the aqueous dispersion of polyurethane resin (a) used in this invention, it is preferred that the average dispersion particle diameter of the polyurethane resin does not exceed 500 nm, as the ability to resist crease whitening when the resin is used for separable fasteners is then even better. It is more preferred that the average dispersion particle diameter of the polyurethane resin does not exceed 400 nm, and still more preferred that it does not exceed 300 nm. If the average dispersion particle diameter of the polyurethane resin is 20 nm or greater, the manufacture of the aqueous dispersion of the polyurethane resin is easier, and it is also preferred from the viewpoint that absence of fiber dropout, washability and resistance to chlorine bleaching agents when the resin is used for separable fasteners are even better. It is preferred that the weight proportion of polyurethane resin in the aqueous dispersion of the polyurethane resin (a) is in the range of 10 wt %–60 wt %.

When the resin comprising the aqueous resin composition of this invention is essentially only polyurethane resin, it is necessary that the inherent viscosity ($\eta_{inh}$) of the polyurethane resin measured at a concentration of 0.5 g/dL in dimethylformamide (hereafter, DMF) is 0.2 dL/g to 0.7 dL/g (Condition (II)). When the resin comprising the aqueous resin composition is essentially only polyurethane resin, and the inherent viscosity of the polyurethane resin is less than 0.2 dL/g, resistance to fiber dropout in washing and resistance to chlorine bleaching agents when the resin is used in separable fasteners, decline. Conversely, when the resin comprising the aqueous resin composition is essentially only polyurethane resin, and the inherent viscosity of the polyurethane resin is greater than 0.7 dL/g, resistance to chlorine bleaching agents and resistance to crease whitening when the resin is used in separable fasteners decline. It is preferred that the inherent viscosity of the polyurethane resin is 0.25 dL/g to 0.6 dL/g, and more preferred that it is 0.3 dL/g to 0.5 dL/g. When the aqueous resin composition also contains an aqueous dispersion of an acrylic resin in addition to the aqueous dispersion of the polyurethane resin, resistance to chlorine bleaching agents and resistance to crease whitening of separable fasteners are improved by the acrylic resin, and although there is then no particular restriction on the inherent viscosity of polyurethane resin, the above limits are to be preferred.

As the inherent viscosity of the polyurethane resin increases the higher the molecular weight of the polyurethane resin, it can be adjusted to a target value by adjusting the molecular weight of the polyurethane resin. The molecular weight of the polyurethane resin may be controlled by varying the reaction molar ratio of the macromolecular polyol, chain extending agent and active hydrogen-containing compound such as 2,2-dimethylolbutanoic acid to the organic polyisocyanate used in manufacture, or by using a monofunctional compound such as a monoamine, amino carboxylic acid and mono-ol as part of the starting material for the polyurethane resin.

Regarding the aqueous dispersion of polyurethane resin (a) used in this invention, the polyurethane resin may contain a compound which has a plasticizing effect on the polyurethane resin. By including a compound which has a plasticizing effect on the polyurethane resin, the durability of the separable fastener obtained may be improved. There is no particular limitation on the compound having the plasticizing effect on the polyurethane resin, but compounds having excellent resistance to miscibility with the polyurethane resin such as ethylenedibromide-4,4'-isopropylidene bis(2,6-dibromophenol) condensate are suitable. The addition amount of the compound having a plasticizing effect is from 50 weight parts or less to 0 weight parts or more relative to 100 weight parts of polyurethane resin, which is preferred from the viewpoint of the manufacturing stability of the aqueous dispersion of the polyurethane resin (a) and performance of the separable fastener. A range of 0–30 weight parts is more preferred.

Regarding the inherent viscosity of the polyurethane resin when the polyurethane resin contains a compound having a plasticizing effect, the inherent viscosity of a polyurethane resin manufactured in an identical manner except that the compound having a plasticizing effect is not added, or the inherent viscosity of a polyurethane resin measured after the compound having a plasticizing effect has been removed by dissolution in an organic solvent which does not dissolve the polyurethane resin, may be used.

The aqueous dispersion of acrylic resin (b) used in this invention is obtained by dispersing a resin, obtained by polymerizing an ethylenic unsaturated monomer having a (meth) acrylate[(meth)acrylate means acrylate and methacrylate in this invention] as its main component, in water.

The (meth)acrylate used in this invention may be methyl (meth)acrylate, ethyl (meth)acrylate, butyl (meth)acrylate, 2-ethylhexyl (meth)acrylate, lauryl (meth)acrylate, stearyl (meth)acrylate, cyclohexyl (meth)acrylate, isobornyl (meth) acrylate, benzyl (meth)acrylate, (meth)acrylic acid, glycidyl (meth)acrylate, dimethylaminoethyl (meth)acrylate, diethylaminoethyl (meth)acrylate, 2-hydroxyethyl (meth)acrylate or 2-hydroxypropyl (meth)acrylate. Of these, the use of at least one of methyl (meth)acrylate, ethyl (meth)acrylate, butyl (meth) acrylate or (meth) acrylic acid [(meth)acrylic acid means acrylic acid and methacrylic acid in this invention] is particularly to be preferred from the aspects of durability of the fibrous sheet and ease of manufacture of the aqueous dispersion of the acrylic resin.

To the extent that the performance of the separable fastener obtained is not compromised, other ethylenic unsaturated monomers may be copolymerized together with the (meth)acrylate. Examples of ethylenic unsaturated monomers which can be used are aromatic vinyl compounds such as styrene, α-methylstyrene and p-methylstyrene; amides of unsaturated carboxylic acids such as (meth) acrylamide and diacetone acrylamide; maleic acid, fumaric acid, itaconic acid or their derivatives; heterocyclic vinyl compounds such as vinyl pyrrolidone; vinyl compounds such as vinyl chloride, acrylonitrile, vinyl ether, vinyl ketone and vinyl amide; and α-olefins such as ethylene and propylene, one, two or more of these compounds being used.

Polyfunctional ethylenic unsaturated monomers having two or more functional groups may also be used concurrently. Examples of polyfunctional ethylenic unsaturated monomers are di(meth)acrylates such as ethylene glycol di(meth)acrylate, diethylene glycol di(meth)acrylate, triethylene glycol di(meth)acrylate, polyethylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate and glycerine di(meth)acrylate; tri(meth)acrylates such as trimethylolpropane tri(meth)acrylate and pentaerythritol tri(meth)acrylate; tetra(meth)acrylates such as pentaerythritol tetra(meth)acrylate; polyfunctional aromatic vinyl compounds such as divinylbenzene and trivinylbenzene; and compounds containing two or more different ethylenic unsaturated bonds such as allyl (meth)acrylate and vinyl (meth)acrylate, one, two or more of these compounds being used.

From the viewpoint of superior resistance to ruffling and resistance to crease whitening when the resin is used in separable fasteners, ethylenic unsaturated monomers wherein the proportion of the (meth)acrylate is from 60 wt % to 100 wt % are preferably used, but ethylenic unsaturated monomers wherein the proportion of the (meth)acrylate is 70 wt % or higher are more preferred, and ethylenic unsaturated monomers wherein the proportion of the (meth) acrylate is 80 wt % or higher are still more preferred.

Further, from the viewpoint of superior resistance to ruffling when the resin is used in separable fasteners, the usage amount of polyfunctional ethylenic unsaturated monomers is preferably 0.1 wt % to 20 wt %, more preferably 0.5 wt % to 15 wt % and still more preferably 1 wt % to 10 wt % relative to the total weight of monomer.

The inclusion of carboxyl groups in the resin skeleton of the acrylic resin used in this invention is preferable as it gives excellent performance when the resin is used in separable fasteners. The introduction of carboxyl groups in the resin skeleton may be accomplished by using a carboxyl group-containing monomer such as (meth) acrylic acid as part of the ethylenic unsaturated monomers. The carboxyl group content is preferably 20 mmol to 60 mmol per 100 g of acrylic resin, and more preferably 25 mmol to 50 mmol per 100 g of acrylic resin. When the carboxyl group content is less than 20 mmol per 100 g of acrylic resin, resistance to crease whitening tends to decrease when the resin is used in separable fasteners, and when the carboxyl group content exceeds 60 mmol per 100 g of acrylic resin, resistance to fiber dropout in washing, washability and resistance to chlorine bleaching agents when the resin is used in separable fasteners, tend to decrease.

Any of the prior art methods may be used to manufacture the aqueous dispersion of the acrylic resin (b) used in this invention, there being no particular limitation. For example, it may be obtained by the polymerization of an ethylenic unsaturated monomer having a (meth)acrylate as its main component in water. In this case, there is no particular limitation on polymerization conditions which may be identical to those of emulsion polymerization of ethylenic unsaturated monomers known in the art, but in general, it is preferred to carry out the emulsion polymerization at a temperature of 0° C. to 90° C. in an inert gas atmosphere from the viewpoint of polymerization stability.

Examples of polymerization initiators which may be used in the polymerization of the ethylenic unsaturated monomer are oil-soluble peroxides such as benzoyl peroxide, lauroyl peroxide, dicumyl peroxide, di-t-butyl-peroxide, cumene hydroperoxide, t-butyl hydroperoxide, and diisopropylbenzene hydroperoxide; oil-soluble azo compounds such as 2,2'-azobisisobutyronitrile and 2,2'-azobis(2,4-dimethylvaleronitrile); water-soluble peroxides such as hydrogen peroxide, potassium persulfate, sodium persulfate and ammonium persulfate; and water-soluble azo compounds such as 4,4'-azobis(4-cyanovaleric acid) and 2,2'-azobis(2-amidinopropane) dihydrochloride, one, two or more of these compounds being used. Redox initiators which make use of reducing agents such as ferrous sulfate, copper sulfate, rongalite (sodium formaldehydesulfoxylate), sodium thiosulfate and sodium ascorbate, and, if necessary, chelating agents such as sodium pyrophosphate and salt of ethylenediaminetetraacetic acid, may also be used together with the polymerization initiator.

A surfactant may also be used to emulsify the acrylic resin in the water. Examples of surfactants are anionic surfactants such as sodium lauryl sulfate, ammonium lauryl sulfate, sodium polyoxyethylene tridecylether acetate, sodium dodecylbenzenesulfonate, sodium alkyldiphenylether disulfonate and sodium di(2-ethylhexyl) sulfosuccinate; and non-ionic surfactants such as polyoxyethylene nonylphenylether, polyoxyethylene octylphenylether, polyoxyethylene lauryl ether, polyoxyethylene stearyl ether and polyoxyethylene-polyoxypropylene block copolymer. Surfactants containing ethylenic unsaturated groups, i.e., reactive surfactants, may also be used.

It is preferred that the average dispersion particle diameter in the aqueous dispersion of acrylic resin used in this invention is 1 μm or less, as this gives even better resistance to crease whitening when the resin is used for separable fasteners, but 700 nm or less is more preferred, and 500 nm or less is still more preferred. It is also preferred that the average dispersion particle diameter of the acrylic resin is 50 nm or greater, as this gives better resistance to fiber dropout during washing when the resin is used for separable fasteners, and makes manufacture of the aqueous dispersion of the acrylic resin easier.

Further, it is preferred that the dispersion particle diameter of the acrylic resin is at least 1.2 times the dispersion particle diameter of the polyurethane resin, as this gives even better washability and resistance to chlorine bleaching agents when the resin is used for separable fasteners, but at least 1.5 times is more preferred, and at least 1.8 times is still more preferred. However, if it is more than 20 times, it is difficult to manufacture the dispersion and costs increase, therefore 20 times or less is to be preferred.

It is preferred that the weight proportion of acrylic resin in the aqueous dispersion of acrylic resin (a) is in the range of 10–60 wt %.

The resin comprising the aqueous composition of this invention, in addition to carboxyl groups, may comprise a reactive functional group other than carboxyl, examples being hydrazide, carbonyl, epoxy, cyclocarbonate, silanol, hydroxyl and block isocyanate.

The aqueous resin composition of this invention, in addition to the aqueous dispersion of polyurethane resin or acrylic resin, may also comprise a water-soluble or water-dispersible curing agent (c).

The curing agent (c) used in this invention is a water-soluble or water-dispersible compound having two or more functional groups capable of reacting with carboxyl groups in the resin. Examples of functional groups capable of reacting with carboxyl groups are one or more of epoxy, carbodiimide and oxazoline. It is convenient that this curing agent is a compound having a molecular weight in the range of 100–10 trillion, and containing two or more of the above functional groups. Examples are polyfunctional epoxy compounds such as "CR-5L" (trade name; product by Dainippon Ink & Chemicals, Inc.), "Denacol EX-321" (trade names; product by Nagase Chemical Ltd.), "Denacol EX-611" (trade names; product by Nagase Chemical Ltd.) and "Denacol EX-614B" (trade names; product by Nagase Chemical Ltd.); polyfunctional carbodiimide compounds such as "Carbodilite E-01" (trade name; product by Nisshinbo Industries, Inc.) and "Carbodilite V-02" (trade name; product by Nisshinbo Industries, Inc.); and polyfunctional oxazoline compounds such as "Epocross WS-500" (trade name; product by Nippon Shokubai Co., Ltd.) and "Epocross K-2010E" (trade name; product by Nippon Shokubai Co., Ltd.).

Of these, water-soluble polyfunctional epoxy compounds such as CR-5L, Denacol EX-321, Denacol EX-611 and Denacol EX-614B are preferred as they are economical, and the separable fasteners obtained from them have particularly good performance. Other compounds having an aziridine group may also be used as curing agents giving excellent performance, but they generate ethyleneimines which are toxic to humans, and are therefore undesirable from the viewpoint of safety.

In this invention, it is preferred that the blending proportion of the resin comprising the aqueous resin composition and the curing agent (c) is 100:1 to 100:20 in terms of effective components, which gives high durability of fibrous sheets processed with this composition, but 100:3 to 100:15 is more preferred and 100:5 to 100:12 is still more preferred.

In this invention, after drying the aqueous resin composition, it is required that the elastic modulus at 25° C. of the film obtained by treatment at 80° C. for eight hours is $8.0 \times 10^6$ to $5.0 \times 10^8$ Pa, and that the elastic modulus at 80° C. does not exceed $8.0 \times 10^7$ Pa (Condition (III)). It is preferred that the elastic modulus at 25° C. is $9.0 \times 10^6$–$4.0 \times 10^8$ Pa and the elastic modulus at 80° C. does not exceed $6.0 \times 10^7$ Pa, and more preferred that the elastic modulus at 25° C. is $1.0 \times 10^7$–$3.0 \times 10^8$ Pa and the elastic modulus at 80° C. is $1.0 \times 10^6$–$4.0 \times 10^7$ Pa.

When the elastic modulus at 25° C. is less than $8.0 \times 10^6$ Pa, resistance to fiber dropout in washing, washability and resistance to chlorine bleaching agents when the resin is used in separable fasteners decrease. On the other hand, when the elastic modulus at 25° C. is higher than $5.0 \times 10^8$ Pa, resistance to chlorine bleaching agents and resistance to crease whitening when the resin is used in separable fasteners decrease. When the elastic modulus at 80° C. is higher than $8.0 \times 10^7$ Pa, the adherence of the resin composition to fibers is poor even if heat treatment is performed after processing the aqueous resin composition, and performance when the resin is used in separable fasteners declines. There is no particular lower limit for the elastic modulus at 80° C., but from the viewpoint of ease of handling of the fibrous sheet, it is preferred that it is $5.0 \times 10^5$ Pa or higher.

The combination of resin components may be suitably chosen to place the elastic modulus of the film within the above limits. For example, by increasing the hard segment amount of polyurethane resin and increasing the glass transition temperature of the acrylic resin, the elastic modulus of the film can be increased. Conversely, by increasing the soft segment amount of polyurethane resin and decreasing the glass transition temperature of the acrylic resin, the elastic modulus of the film can be decreased. Based on this, the elastic modulus of the film can easily be placed within the above limits by determining the resin composition.

The aqueous resin composition of this invention may also contain additives commonly used in the art, for example thickeners, hardening accelerators, extending agents, fillers, light stabilizers, antioxidants, ultraviolet absorbers, fluorescent agents, antifungal agents, flame retardants, surfactants such as penetrants or defoaming agents, water-soluble polymer compounds such as polyvinyl alcohol or carboxymethyl cellulose, and dyes or pigments. Other aqueous resins may also be added to the extent that they do not interfere with this invention. As described above, the main components of the aqueous resin composition of this invention are an aqueous dispersion of a polyurethane resin (a), and if necessary, an aqueous dispersion of an acrylic resin (b). It is preferred that the proportion of (a) and (b) in the total weight of aqueous resin composition is 70 wt % to 100 wt %, and that the proportion of solids in the aqueous resin composition of this invention is 10 wt % to 60 wt %.

In this invention, in the resin comprising the aqueous resin composition, it is preferred that the amount of carboxyl groups is 20 mmol to 60 mmol per 100 g of resin as it gives excellent performance when the resin is used in separable fasteners.

When the aqueous resin composition of this invention is applied to a separable fastener base fabric, the separable fastener base fabric which is used may comprise hooks and loops arranged on separate pieces of fabric, or both hooks and loops may be arranged on the same piece of fabric. In this invention, the separable fastener prior to coating of the aqueous resin composition of this invention on the back surface, is referred to as the separable fastener base fabric. It is preferred that the hooks and loops and the fabric on which they are arranged are manufactured from a synthetic fiber, for example a fiber comprising a polyamide polymer such as nylon 6, nylon 66, nylon 610, nylon 12, nylon 6T, nylon 9T or a copolymer having these as main components, or a polyester polymer such as polyethylene terephthalate, polypropylene terephthalate, polybutylene terephthalate, or a copolymer having these as main components.

It is particularly preferred if the separable fastener base fabric comprises a polyamide yarn having a fineness of 50 to 350 decitex, the loops comprise a multifilament yarn having a fineness of 150 to 300 decitex wherein 5–20 polyamide filaments are stranded together, and the hooks comprise a polyamide monofilament having a fineness of 100 to 500 decitex, as the effects of the invention are then particularly marked. When the separable fastener base fabric is formed from a textile, the fineness of the yarn comprising the textile is preferably 25 to 300 yarn counts, the basis weight of the base fabric being within a range of 40 to 500 g/m². It is preferred that the separable fastener base fabric manufactured from a synthetic fiber such as polyamide fiber or polyester fiber used in this invention is first sufficiently degummed or dyed before coating it with the aqueous resin composition of this invention.

In this invention, there is no particular limitation on the back coating methods used to apply the aqueous resin composition for the back surface of the separable fastener base fabric, for example the back surface of the separable fastener base fabric may be coated and impregnated by a roll coater or spray coater, dried and heat-treated. It is preferred that the temperature and time of drying and heating satisfy the relations (1) given below. If the drying and heating temperature are different, e.g., when drying and heating is performed in several stages, it is better that the sum total of $t \times 0.5^{-T/10}$ in the relations (1) calculated using the times at each temperature, satisfy the relations (1).

If the value of $t \times 0.5^{-T/10}$ in relation (1) is less than 1000 and the temperature is less than 40° C., the crosslinking reaction of the resin composition tends to be incomplete, and resistance to chlorine bleaching agents and resistance to crease whitening of the separable fastener obtained tend to decline. If the temperature exceeds 200° C., yellowing and decline in performance may occur due to thermal oxidation and deterioration of the fiber or resin, and costs also increase which is undesirable. It is preferred that the drying and/or heating is performed at a temperature and for a time satisfying the relations (2) below, and more preferred that it is performed at a temperature and for a time satisfying the relations (3) below.

$$t \times 0.5^{-T/10} \geq 1000, \ 40 \leq T \leq 200 \quad (1)$$

where t is the drying and heating time (hr), and T is the drying and heating temperature (° C.).

$$t \times 0.5^{-T/10} \geq 1200, \ 45 \leq T \leq 180 \quad (2)$$

$$1500 \leq t \times 0.5^{-T/10} \leq 10000, \ 50 \leq T \leq 160 \quad (3)$$

In this invention, it is preferred that the amount of aqueous resin composition back-coated on the separable fastener base fabric is in the range of 5 g/m²–200 g/m², more preferred that it is in the range of 15 g/m²–80 g/m² and still more preferred that it is in the range of 20 g/m² to 50 g/m² in terms of solids.

By back coating the aqueous resin composition of this invention, a separable fastener having no fiber dropout in washing, good washability, high resistance to chlorine bleaching agents, high resistance to crease whitening and durability, and excellent performance, is obtained.

The separable fastener is the best example of the fibrous sheet obtained from the aqueous resin composition of this invention, as described above, however other examples may be mentioned such as raincoats, diaper covers, tents, containers, tablecloths, bookbinding cloths, wall cloths, training curtains, sail cloths, tent fabric and waterproof cloths such as construction sheeting, and this invention may conveniently be applied as a coating resin or impregnating resin used to form these fiber products.

This invention will now be described in detail by means of examples and comparative examples, but this invention is not to be construed as being limited by these examples in any way. In the following examples, the inherent viscosity of the polyurethane resin, dispersion particle diameter of the aqueous resin dispersion, elastic modulus of the film, and the extent of fiber dropout in washing, washability, resistance to chlorine bleaching agents, resistance to crease whitening and durability of the separable fastener, were measured or evaluated as described below.

[Inherent Viscosity of Polyurethane Resin]

A polyurethane resin obtained by drying an aqueous dispersion of polyurethane resin was dissolved in DMF solvent such that its concentration was 0.5 g/dL, and the time required for the liquid surface of the polyurethane resin solution to pass between the marks of a viscometer was measured, using an Ostwald viscometer adjusted to 30° C. An identical measurement was performed using only DMF solvent, and the inherent viscosity ($\eta_{inh}$) of the polyurethane resin was calculated by the following equation:

$$\eta_{inh} = \ln \text{(time required for polyurethane resin solution/time required for DMF)}/0.5$$

[Average Dispersion Particle Diameter of Resin Aqueous Dispersion]

Measurements were performed by a dynamic light scattering method using an "ELS-800" (trade name; Otsuka Electronics Co., Ltd.), an analysis was carried out by the cumulant method (as described in [Colloid Science, Vol. 4, Experimental Methods in Colloid Science], p. 103, published by Tokyo Kagaku Dojin Co., incorporated herein by reference), and the average particle diameter of the dispersion particles in the resin aqueous dispersion was calculated.

[Elastic Modulus of Film]

A film of 200 μm thickness obtained by drying the aqueous resin composition at 50° C. was heated at 80° C. for 8 hours, measurements were performed at a frequency of 1 Hz and with a temperature gradient of 3° C./min using a Rheology viscoelasticity meter, [FT Rheospectra-DVE-V4], and the elastic modulus (E') at 25° C. and 80° C. was determined.

[Resistance to Fiber Dropout in Washing]

Using a household washing machine (35 liters), a synthetic detergent ["Top" (trade name; LION CORPORATION)] was added in a proportion of 1 g per 1 L of water at 25° C., and stirred. A separable fastener formed by sticking together hook and loop fasteners measuring 20 cm in length by 2.5 cm in width, and having a cut at 15 cm, was introduced into the washing machine together with 1 kg of fabric, washed for 8 hours, and the presence or absence of fiber dropout at the cut was evaluated. The evaluation was performed according to the following scale. Separable fasteners attaining a score of 4 or higher were taken as having passed the test.

5: No fiber dropout
4: Slight dropout in parts
3: Dropout all over
2: Dropout all over with tangling
1: Marked dropout all over with tangling

[Washability]

Washing was performed in an identical manner to that of the evaluation of fiber dropout in washing. Hooks and loops were attached and detached 5000 times, disarray of the nap in the loops was observed, and an evaluation of its extent was performed according to the following criteria.

5: No disarray of the nap
4: Slight disarray of nap in parts
3: Slight disarray of nap occurs all over
2: Considerable disarray of nap all over
1: Marked disarray of nap occurs all over

[Resistance to Chlorine Bleaching Agents]

The separable fastener was impregnated with an undiluted chlorine bleaching agent ["Haita" (trade name; Kao Corporation)] for 24 hours, and dried. Hooks and loops were attached and detached 50 times, disarray of the nap in the loops was observed, and an evaluation of its extent was made using identical criteria as for above washability.

[Resistance to Crease Whitening]

The separable fastener was evaluated as follows according to the extent of whitening when it was creased.

o: Almost no whitening
Δ: Slight whitening
X: Marked whitening

[Durability]

The separable fastener was left for a predetermined period at 70° C. under a relative humidity of 95%, and the durability was evaluated.

The symbols for the compounds used in the examples and comparative examples are given in Table 1 and Table 2.

TABLE 1

| Symbols | Compound |
|---|---|
| PTG850 | Polytetramethylene glycol of average molecular weight 850 |
| PTG1000 | Polytetramethylene glycol of average molecular weight 1000 |
| PMPA1000 | Poly(3-methyl-1,5-pentylene adipate) diol of average molecular weight 1000 |
| PHC2000 | Polyhexamethylene carbonate diol of average molecular weight 2000 |
| IPDI | Isophorone diisocyanate |
| DMBA | 2,2-dimethylolbutanoic acid |
| DMPA | 2,2-dimethylolpropionic acid |
| TEA | Triethylamine |
| DMAE | Dimethylaminoethanol |
| DEAE | Diethylaminoethanol |
| PIP | Piperazine hexahydrate |
| HH | Hydrazine monohydrate |
| BuAm | n-butylamine |
| AHA | 6-aminohexanoic acid |

TABLE 2

| Symbols | Compound |
|---|---|
| BA | n-butyl acrylate |
| EA | Ethyl acrylate |
| MMA | Methyl methacrylate |
| MAA | Methacrylic acid |
| HDDA | Hexanediol diacrylate |
| ALMA | Allylmethacrylate |
| KPS | Potassium persulfate |
| SDOSS | Sodium di(2-ethylhexyl)sulfosuccinate |
| SS-H | Anionic surfactant ["Pellex SS-H" trade name; Kao Corporation)] |
| CR-5L | Water-soluble polyepoxy compound "CR-5L" (trade name; product by Dainippon Ink & Chemicals, Inc.)] |
| E-01 | Water-dispersible carbodiimide compound "Carbodilite E-01" (trade name; product by Nisshinbo Industries, Inc.), effective component concentration 40% |

[Manufacture of Polyurethane Resin Aqueous Dispersion]

REFERENCE EXAMPLE 1

A polyurethane prepolymer was manufactured by weighing out 400 g PTG1000, 302 g IPDI and 44.4 g DMBA in a three-necked flask, and stirring at 90° C. for two hours under dry nitrogen atmosphere to quantitatively react the hydroxyl groups in the system. Next, the mixture was cooled to 55° C., an aqueous solution comprising 31.4 g DEAE dissolved in 685 g of distilled water was added during 5 minutes, and the mixture was stirred for 3 minutes to obtain an emulsion. Next, 411 g of distilled water was added and the mixture stirred for 3 minutes, an aqueous solution of 58.5 g PIP, 13.1 g HH and 4.6 g BuAm in 185 g of distilled water was added during 1 minute, and the mixture stirred for a further 3 hours to carry out a chain extending reaction. A polyurethane resin aqueous dispersion comprising 36 wt % of solids (hereafter referred to as PU (1)) was thereby obtained.

REFERENCE EXAMPLES 2, 3

Polyurethane resin aqueous dispersions (hereafter referred to as PU (2), (3)) were obtained in an identical way to that of Reference Example of 1 using the starting materials shown in Table 3.

REFERENCE EXAMPLE 4

An identical procedure to that of Reference Example 1 was performed, excepting that after manufacturing the polyurethane prepolymer, prior to emulsification, ethylenedibromide-4,4'-isopropylidene bis(2,6-dibromophenol) condensate ["FG-3000" (trade name; product by Teijin Chemicals Ltd.)] was added in a proportion of 10 weight parts to 100 weight parts of polyurethane resin, and homogeneously dissolved. A polyurethane resin aqueous dispersion comprising 40 wt % of solids (referred to hereafter as PU (4)) was thereby obtained.

REFERENCE EXAMPLE 5

An identical procedure to that of Reference Example 1 was performed, excepting that using the starting materials shown in Table 3, prior to emulsification of the polyurethane prepolymer, 2-butanone was added in a proportion of 50 weight parts to 100 weight parts of the polyurethane prepolymer to dilute the polyurethane prepolymer. After emulsifying and carrying out a chain extending reaction, the 2-butanone was removed under reduced pressure. A polyurethane resin aqueous dispersion comprising 36 wt % of solids (referred to hereafter as PU (5)) was thereby obtained.

REFERENCE EXAMPLES 6–10

Identical procedures to that of Reference Example 1 were performed, excepting that the starting materials shown in Table 4 were used. Polyurethane resin aqueous dispersion comprising 36 wt % of solids (referred to hereafter as PU(6)–PU(10)) were thereby obtained.

[Manufacture of Acrylic Resin Aqueous Dispersion]

REFERENCE EXAMPLE 11

(1) Initial Preparation:
0.15 g SS-H and 919 g distilled water were weighed out in a flask fitted with a cooling tube, the temperature was raised to 80° C., and the atmosphere in the system was completely replaced by nitrogen.

(2) Emulsion Polymerization:
Next, an aqueous solution comprising 0.32 g KPS and 9.6 g distilled water was added, and after 5 minutes, a mixed solution of 253.7 g BA, 5.01 g HDDA, 0.46 g ALMA and 1.15 g SDOSS was dripped into the flask from a dropping funnel for 120 minutes. After the solution had been introduced, the temperature was maintained at 80° C. for 30 minutes. Subsequently, an aqueous solution comprising 0.09 g KPS and 2.6 g distilled water was added, and after 5 minutes, a mixed solution comprising 82.1 g MMA, 3.9 g BA, 0.35 g HDDA, 0.09 g ALMA and 0.43 g SDOSS was dripped into the flask from a dropping funnel for 50 minutes. After the solution had been introduced, the temperature was maintained at 80° C. for 30 minutes. An aqueous solution comprising 0.35 g KPS and 10.5 g distilled water was then added, and after 5 minutes, a mixed solution comprising 218.9 g BA, 11.5 g MAA and 1.15 g SDOSS was dripped into the flask from a dropping funnel for 100 minutes. After the solution had been introduced, the temperature was maintained at 80° C. for 60 minutes to complete the polymerization. Next, a mixed solution comprising 12.2 g TEA and 70.0 g distilled water was added, and an acrylic resin aqueous dispersion containing 36 wt % solids and having an average dispersion particle diameter of 315 nm (referred to hereafter as acrylic (1)) was thereby obtained.

REFERENCE EXAMPLE 12

(1) Initial Preparation:
0.15 g SS-H and 920 g distilled water were weighed out in a flask fitted with a cooling tube, the temperature was raised to 80° C., and the atmosphere in the system was completely replaced by nitrogen.

(2) Emulsion Polymerization:
Next, an aqueous solution comprising 0.26 g KPS and 7.9 g distilled water was added, and after 5 minutes, a mixed solution of 199.6 g MMA, 2.02 g HDDA and 1.01 g SDOSS was dripped into the flask from a dropping funnel for 90 minutes. After the solution had been introduced, the temperature was maintained at 80° C. for 30 minutes. Subsequently, an aqueous solution comprising 0.20 g KPS and 6.1 g distilled water was added, and after 5 minutes, a mixed solution comprising 199.6 g BA, 2.02 g HDDA and 1.01 g SDOSS was dripped into the flask from a dropping funnel for 90 minutes. After the solution had been introduced, the temperature was maintained at 80° C. for 30 minutes . An aqueous solution comprising 0.26 g KPS and 7.9 g distilled water was then added, and after 5 minutes, a mixed solution comprising 159.0 g BA, 13.8 g MAA and 0.86 g SDOSS was dripped into the flask from a dropping funnel for 90 minutes. After the solution had been introduced, the temperature was maintained at 80° C. for 60 minutes to complete the polymerization. Next, a mixed solution comprising 12.2 g TEA and 70.0 g distilled water was added, and an acrylic resin aqueous dispersion containing 36 wt % solids and having an average dispersion particle diameter of 306 nm (referred to hereafter as acrylic (2)) was thereby obtained.

REFERENCE EXAMPLE 13

(1) Initial Preparation:
0.15 g SS-H and 919 g distilled water were weighed out in a flask fitted with a cooling tube, the temperature was raised to 80° C., and the atmosphere in the system was completely replaced by nitrogen.

(2) Emulsion Polymerization:
Next, an aqueous solution comprising 0.41 g KPS and 12.5 g distilled water was added, and after 5 minutes, a mixed solution of 335.8 g BA, 5.36 g HDDA, 0.55 g ALMA and 1.58 g SDOSS was dripped into the flask from a dropping funnel for 180 minutes. After the solution had been introduced; the temperature was maintained at 80° C. for 30 minutes. Subsequently, an aqueous solution comprising 0.35 g KPS and 10.5 g distilled water was added, and after 5 minutes, a mixed solution comprising 218.9 g BA, 11.5 g MAA and 1.15 g SDOSS was dripped into the flask from a dropping funnel for 100 minutes. After the solution had been introduced, the temperature was maintained at 80° C. for 60 minutes to complete the polymerization. Next, a mixed solution comprising 12.2 g TEA and 70.0 g distilled water was added, and an acrylic resin aqueous dispersion containing 36 wt % solids and having an average dispersion particle diameter of 311 nm (referred to hereafter as acrylic (3)) was thereby obtained.

REFERENCE EXAMPLE 14

(1) Initial Preparation:
0.15 g SS-H and 919 g distilled water were weighed out in a flask fitted with a cooling tube, the temperature was raised to 80° C., and the atmosphere in the system was completely replaced by nitrogen.

(2) Emulsion Polymerization:
Next, an aqueous solution comprising 0.41 g KPS and 12.5 g distilled water was added, and after 5 minutes, a mixed solution of 331.9 g MMA, 3.9 g BA, 5.36 g HDDA, 0.55 g ALMA and 1.58 g SDOSS was dripped into the flask from a dropping funnel for 180 minutes. After the solution had been introduced, the temperature was maintained at 80° C. for 30 minutes. Subsequently, an aqueous solution comprising 0.35 g KPS and 10.5 g distilled water was added, and after 5 minutes, a mixed solution comprising 207.4 g MMA, 11.5 g BA, 11.5 g MAA and 1.15 g SDOSS was dripped into the flask from a dropping funnel for 100 minutes. After the solution had been introduced, the temperature was maintained at 80° C. for 60 minutes to complete the polymerization. Next, a mixed solution comprising 12.2 g TEA and 70.0 g distilled water was added, and an acrylic resin aqueous dispersion containing 36 wt % solids and having an average dispersion particle diameter of 293 nm (referred to hereafter as acrylic (4)) was thereby obtained.

REFERENCE EXAMPLE 15

(1) Initial Preparation:

0.15 g SS-H and 919 g distilled water were weighed out in a flask fitted with a cooling tube, the temperature was raised to 80° C., and the atmosphere in the system was completely replaced by nitrogen.

(2) Emulsion Polymerization:

Next, an aqueous solution comprising 0.41 g KPS and 12.5 g distilled water was added, and after 5 minutes, a mixed solution of 251.9 g MMA, 83.9 g EA, 5.36 g HDDA, 0.55 g ALMA and 1.58 g SDOSS was dripped into the flask from a dropping funnel for 180 minutes. After the solution had been introduced, the temperature was maintained at 80° C. for 30 minutes. Subsequently, an aqueous solution comprising 0.35 g KPS and 10.5 g distilled water was added, and after 5 minutes, a mixed solution comprising 164.2 g MMA, 54.7 g EA, 11.5 g MAA and 1.15 g SDOSS was dripped into the flask from a dropping funnel for 100 minutes.

After the solution had been introduced, the temperature was maintained at 80° C. for 60 minutes to complete the polymerization. Next, a mixed solution comprising 12.2 g TEA and 70.0 g distilled water was added, and an acrylic resin aqueous dispersion containing 36 wt % solids and having an average dispersion particle diameter of 302 nm (referred to hereafter as acrylic (5)) was thereby obtained.

EXAMPLE 1

30 g of a polyfunctional epoxy compound [epoxy crosslinking agent "CR-5L" (trade name; product by Dainippon Ink & Chemicals, Inc.)], i.e., 8.3 weight parts to 100 weight parts of polyurethane resin solids, was added to 1000 g of PU(1) obtained in Reference Example 1, 12 g of a thickener ["RM-830" (trade name; product by Roam and Haas)] was added, and thoroughly blended. The mixed solution thus obtained was coated by a roll coater onto a hook separable fastener fibrous cloth having a width of 10 cm comprising nylon 66 fiber (the yarns in the cloth were multifilaments of 155 decitex each comprising 24 nylon 66 filaments, the filament in the hook were monofilaments of nylon 66 of 370 decitex, and the basis weight of the base fabric was 320 g/m$^2$), and onto a loop separable fastener fibrous cloth having a width of 10 cm comprising nylon 6 fiber (the yarns in the cloth were multifilaments of 155 decitex each comprising 12 nylon 6 filaments of 155 decitex, the yarns in the loop were multifilaments of 235 decitex each comprising 10 nylon 6 fibers, and the basis weight of the base fabric was 300 g/m$^2$), at a coating rate of 35 g/m$^2$ in terms of solid. The resulting product was dried at 120° C. for 2.5 minutes to evaporate moisture and heated in an atmosphere at 80° C. for 8 hours, and its properties were evaluated. The results are shown in Table 6. As can be seen from Table 6, the separable fastener obtained has excellent resistance to fiber dropout in washing, washability, resistance to chlorine bleaching agents and resistance to crease whitening.

EXAMPLES 2–10

Separable fasteners were manufactured by an identical procedure to that of Example 1, except that the aqueous resin compositions shown in Table 5 were used, and drying and heat treatment were performed under the conditions shown in Table 5. Their performance is shown in Table 6.

COMPARATIVE EXAMPLES 1–10

Separable fasteners were manufactured by an identical procedure to that of Example 1, except that the aqueous resin compositions shown in Table 7 were used, and drying and heat treatment were performed under the conditions shown in Table 7. Their performance is shown in Table 8:

From the results of Examples 1–10 and Comparative Examples 1–10, it can be seen that when the aqueous resin composition of this invention is used, absence of fiber dropout in washing, washability, resistance to chlorine bleaching agents and resistance to crease whitening are all satisfactory. It is also seen that, in the case of Example 4 containing a compound having a plasticizing effect on the polyurethane resin, durability is improved compared to Example 3 which does not contain a compound having a plasticizing effect on the polyurethane resin.

On the other hand, when 2,2-dimethylolbutanoic acid is not used as a starting material for the polyurethane resin, or when the resin comprising the aqueous resin composition is only polyurethane and the inherent viscosity of the polyurethane resin does not lie within the range of the invention, resistance to fiber dropout in washing, resistance to chlorine bleaching agents and resistance to crease whitening are unsatisfactory. It is seen that when the proportion of polyurethane resin in the resin components comprising the aqueous resin composition is less than 20 wt %, washability declines. Further, after drying the aqueous resin composition, if the elastic modulus at 25° C. of the film obtained by heat treatment at 80° C. for 8 hours is less than 8.0×10$^6$ Pa, washability and resistance to chlorine bleaching agents are unsatisfactory, if the elastic modulus at 25° C. exceeds 5.0×10$^8$ Pa, resistance to chlorine bleaching agents and resistance to crease whitening are unsatisfactory, and if the elastic modulus at 80° C. exceeds 8.0×10$^7$ Pa, resistance to fiber dropout in washing, resistance to chlorine bleaching agents and resistance to crease whitening decline.

TABLE 3

| | Resin components (molar ratio) | | | | | | | |
|---|---|---|---|---|---|---|---|---|
| Polyurethane resin aqueous dispersion | Macromolecular polyol | Organic diisocyanate | Carboxyl group-containing compound | Tertiary amine | Chain extending agent | Inherent viscosity (g/dL) | Plasticizer (addition amount) | Average dispersion particle diameter (nm) |
| PU (1) | PTG1000 (1) | IPDI (3.4) | DMBA (0.75) | DEAE (0.67) | PIP (0.75) HH (0.65) BuAm (0.16) | 0.44 | — | 114 |

TABLE 3-continued

| Polyurethane resin aqueous dispersion | Resin components (molar ratio) | | | | | Inherent viscosity (g/dL) | Plasticizer (addition amount) | Average dispersion particle diameter (nm) |
|---|---|---|---|---|---|---|---|---|
| | Macromolecular polyol | Organic diisocyanate | Carboxyl group-containing compound | Tertiary amine | Chain extending agent | | | |
| PU (2) | PTG850 (1) | IPDI (3.0) | DMBA (0.65) | TEA (0.58) | PIP (0.89) HH (0.59) | 0.34 | — | 130 |
| PU (3) | PMPA1000 (1) | IPDI (3.4) | DMBA (0.75) | DEAE (0.67) | PIP (0.70) HH (0.63) AHA (0.14) | 0.48 | — | 128 |
| PU (4) | PMPA1000 (1) | IPDI (3.4) | DMBA (0.75) | DEAE (0.67) | PIP (0.70) HH (0.63) AHA (0.14) | (0.48) | FG-3000 (10 parts) | 141 |
| PU (5) | PMPA1000 (0.67) PHC2000 (0.33) | IPDI (2.5) | DMBA (0.75) | DMAE (0.67) | PIP (0.33) HH (0.27) BuAm (0.14) | 0.51 | — | 107 |

TABLE 4

| Polyurethane resin aqueous dispersion | Resin components (molar ratio) | | | | | Inherent viscosity (g/dL) | Plasticizer (addition amount) | Average dispersion particle diameter (nm) |
|---|---|---|---|---|---|---|---|---|
| | Macromolecular polyol | Organic diisocyanate | Carboxyl group-containing compound | Tertiary amine | Chain extending agent | | | |
| PU (6) | PTG1000 (1) | IPDI (3.4) | DMBA (0.75) | DEAE (0.67) | PIP (0.75) HH (0.65) BuAm (0.16) | 0.43 | — | 131 |
| PU (7) | PMPA1000 (1) | IPDI (3.4) | DMPA (0.75) | DEAE (0.67) | PIP (0.70) HH (0.63) AHA (0.14) | 0.48 | — | 140 |
| PU (8) | PTG1000 (1) | IPDI (3.4) | DMBA (0.75) | DEAE (0.67) | PIP (0.75) HH (0.65) | 0.81 | — | 116 |
| PU (9) | PTG1000 (1) | IPDI (3.5) | DMPA (0.8) | TEA (0.7) | PIP (0.935) HH (0.68) | 0.79 | — | 145 |
| PU (10) | PTG1000 (1) | IPDI (3.4) | DMBA (0.75) | DEAE (0.67) | PIP (0.75) BuAm (1.46) | 0.14 | — | 113 |

TABLE 5

| | Aqueous resin dispersion component | | PU/acrylic weight ratio | Elastic modulus (Pa) | | Drying and heating conditions | |
|---|---|---|---|---|---|---|---|
| | Resin aqueous dispersion | Curing agent | | 25° C. | 80° C. | First stage | Second stage |
| Example 1 | 100 parts PU (1) | 3.0 parts CR-5L | 100/0 | $2.0 \times 10^8$ | $2.9 \times 10^7$ | 120° C. × 2.5 min | 80° C. × 8 hr |
| Example 2 | 100 parts PU (2) | 2.8 parts CR-5L | 100/0 | $2.4 \times 10^8$ | $3.1 \times 10^7$ | 130° C. × 5 min | 100° C. × 2 hr |
| Example 3 | 100 parts PU (3) | 3.5 parts CR-5L | 100/0 | $2.2 \times 10^8$ | $3.1 \times 10^7$ | 120° C. × 5 min | 50° C. × 72 hr |
| Example 4 | 100 parts PU (4) | 3.5 parts CR-5L | 100/0 | $1.7 \times 10^8$ | $1.4 \times 10^7$ | 120° C. × 5 min | 50° C. × 72 hr |
| Example 5 | 100 parts PU (5) | 2.8 parts CR-5L | 100/0 | $3.4 \times 10^7$ | $9.8 \times 10^6$ | 140° C. × 15 min | — |
| Exam le 6 | 100 parts PU (5) | 13.5 parts E-01 | 100/0 | $5.1 \times 10^7$ | $1.6 \times 10^7$ | 140° C. × 15 min | — |
| Example 7 | 50 parts PU (1) 50 parts acrylic (1) | 3.0 parts CR-5L | 50/50 | $2.0 \times 10^8$ | $3.1 \times 10^7$ | 120° C. × 2.5 min | 80° C. × 8 hr |
| Example 8 | 70 parts PU (1) 30 parts acrylic (2) | 3.0 parts CR-5L | 70/30 | $4.8 \times 10^7$ | $7.4 \times 10^6$ | 130° C. × 5 min | 100° C. × 2 hr |
| Example 9 | 60 parts PU (5) 40 parts acrylic (2) | 3.0 parts CR-5L | 60/40 | $8.9 \times 10^6$ | $4.5 \times 10^6$ | 120° C. × 5 min | 50° C. × 72 hr |
| Example 10 | 40 parts PU (8) 60 parts acrylic (1) | 3.0 parts CR-5L | 40/60 | $1.9 \times 10^8$ | $2.9 \times 10^7$ | 140° C. × 15 min | — |

TABLE 6

|  | Resistance to fiber dropout in washing | Washability | Resistance to chlorine bleaching agents | Resistance to crease whitening | Resistance to fiber dropout in washing after durability test | | | |
| --- | --- | --- | --- | --- | --- | --- | --- | --- |
|  |  |  |  |  | After 2 weeks | After 4 weeks | After 6 weeks | After 8 weeks |
| Example 1 | 5 | 5 | 5 | ◯ | 5 | 5 | 5 | 5 |
| Example 2 | 5 | 5 | 5 | ◯ | 5 | 5 | 5 | 5 |
| Example 3 | 5 | 5 | 5 | ◯ | 5 | 4 | 3 | 3 |
| Example 4 | 5 | 5 | 5 | ◯ | 5 | 5 | 4 | 4 |
| Example 5 | 5 | 5 | 5 | ◯ | 5 | 4 | 4 | 4 |
| Example 6 | 4 | 5 | 5 | ◯ | 4 | 4 | 3 | 3 |
| Example 7 | 5 | 5 | 5 | ◯ | 5 | 5 | 5 | 4 |
| Example 8 | 5 | 5 | 5 | ◯ | 5 | 5 | 5 | 5 |
| Example 9 | 4 | 5 | 4 | ◯ | 4 | 4 | 3 | 3 |
| Example 10 | 4 | 5 | 4 | ◯ | 4 | 4 | 4 | 3 |

TABLE 7

|  | Aqueous resin dispersion component | | PU/acrylic weight ratio | Elastic modulus (Pa) | | Drying and heating conditions | |
| --- | --- | --- | --- | --- | --- | --- | --- |
|  | Resin aqueous dispersion | Curing agent |  | 25° C. | 80° C. | First stage | Second stage |
| Comparative Example 1 | 100 parts PU (6) | 3.0 parts CR-5L | 100/0 | $2.3 \times 10^8$ | $3.1 \times 10^7$ | 120° C. × 2.5 min | 80° C. × 8 hr |
| Comparative Example 2 | 100 parts PU (7) | 3.5 parts CR-5L | 100/0 | $2.4 \times 10^8$ | $3.3 \times 10^7$ | 120° C. × 5 min | 50° C. × 72 hr |
| Comparative Example 3 | 100 parts PU (8) | 3.0 parts CR-5L | 100/0 | $1.9 \times 10^8$ | $2.9 \times 10^7$ | 120° C. × 2.5 min | 80° C. × 8 hr |
| Comparative Example 4 | 100 parts PU (9) | 3.0 parts CR-5L | 100/0 | $2.3 \times 10^8$ | $3.2 \times 10^7$ | 120° C. × 2.5 min | 80° C. × 8 hr |
| Comparative Example 5 | 100 parts PU (10) | 3.0 parts CR-5L | 100/0 | $1.5 \times 10^8$ | $1.1 \times 10^7$ | 120° C. × 2.5 min | 80° C. × 8 hr |
| Comparative Example 6 | 40 parts PU (1) 60 parts acrylic (5) | 3.0 parts CR-5L | 40/60 | $7.2 \times 10^8$ | $4.7 \times 10^7$ | 120° C. × 2.5 min | 80° C. × 8 hr |
| Comparative Example 7 | 40 parts PU (5) 60 parts acrylic (3) | 3.0 parts CR-5L | 40/60 | $3.9 \times 10^6$ | $1.1 \times 10^6$ | 120° C. × 2.5 min | 80° C. × 8 hr |
| Comparative Example 8 | 40 parts PU (5) 60 parts acrylic (4) | 3.0 parts CR-5L | 40/60 | $2.6 \times 10^8$ | $1.2 \times 10^8$ | 120° C. × 2.5 min | 80° C. × 8 hr |
| Comparative Example 9 | 50 parts PU (6) 50 parts acrylic (1) | 3.0 parts CR-5L | 50/50 | $2.3 \times 10^8$ | $3.3 \times 10^7$ | 120° C. × 2.5 min | 80° C. × 8 hr |
| Comparative Example 10 | 100 parts acrylic (1) | 3.0 parts CR-5L | 0/100 | $2.2 \times 10^8$ | $3.1 \times 10^7$ | 120° C. × 2.5 min | 80° C. × 8 hr |

TABLE 8

|  | Resistance to fiber dropout in washing | Washability | Resistance to chlorine bleaching agents | Resistance to crease whitening | Resistance to fiber dropout in washing after durability test | | | |
| --- | --- | --- | --- | --- | --- | --- | --- | --- |
|  |  |  |  |  | After 2 weeks | After 4 weeks | After 6 weeks | After 8 weeks |
| Comparative Example 1 | 4 | 5 | 2 | △ | 4 | 4 | 3 | 3 |
| Comparative Example 2 | 3 | 5 | 2 | △ | 3 | 2 | 2 | 1 |
| Comparative Example 3 | 4 | 5 | 3 | △ | 4 | 4 | 3 | 3 |
| Comparative Example 4 | 4 | 5 | 1 | △ | 4 | 3 | 3 | 2 |
| Comparative Example 5 | 3 | 4 | 3 | ◯ | 3 | 2 | 2 | 1 |
| Comparative Example 6 | 4 | 5 | 3 | X | 4 | 4 | 3 | 3 |
| Comparative Example 7 | 3 | 4 | 3 | ◯ | 2 | 2 | 1 | 1 |
| Comparative Example 8 | 3 | 5 | 3 | △ | 3 | 3 | 2 | 2 |
| Comparative Example 9 | 4 | 5 | 3 | △ | 4 | 3 | 3 | 3 |

TABLE 8-continued

|  | Resistance to fiber dropout in washing | Washability | Resistance to chlorine bleaching agents | Resistance to crease whitening | Resistance to fiber dropout in washing after durability test | | | |
|---|---|---|---|---|---|---|---|---|
|  |  |  |  |  | After 2 weeks | After 4 weeks | After 6 weeks | After 8 weeks |
| Comparative Example 10 | 3 | 5 | 4 | ○ | 3 | 3 | 2 | 2 |

According to this invention, an aqueous resin composition for treating fibrous sheets having excellent performance and durability can be obtained without problems regarding safety, hygiene and pollution. Further, when this composition is used as a back coating resin, a separable fastener can be obtained having excellent resistance to fiber dropout in washing, washability, resistance to chlorine bleaching agents and resistance to crease whitening, and having excellent durability so that even after long periods of use, there is practically no ruffling or change of appearance. Moreover, when separable fasteners are manufactured using this back coat aqueous resin composition, there is no problem regarding safety, hygiene or pollution.

Japanese Application Nos. 22797/2001, 46084/2001 and 183140/2001 filed on Jan. 31, 2001, Feb. 22, 2001 and Jun. 18, 2001, respectively, are incorporated herein by reference.

When a range is provided, all values and sub-ranges within the range provided are included.

Obviously, numerous modifications and variations of the present invention are possible in light of the above teachings. It is therefore to be understood that within the scope of the appended claims, the invention may be practiced otherwise than as specifically described herein.

The invention claimed is:

1. A separable fastener coated with a resin composition on a back surface thereof, wherein the resin composition is a dried, heat treated or both dried and heat treated aqueous dispersion of a polyurethane resin, said aqueous polyurethane resin of a dispersion obtained by reacting at least one macromolecular polyol, at least one organic polyisocyanate, a chain extending agent and 2,2-dimethylolbutanoic acid, and, optionally, an aqueous dispersion of an acrylic resin,
wherein the polyurethane resin has an inherent viscosity ($\eta_{inh}$) measured at a concentration of 0.5 g/dL in dimethylformamide solution from 0.2 to 0.7 dL/g when the resin composition consists essentially of a polyurethane resin and wherein a film obtained by heat treatment at 80° C. for 8 hours after drying the resin has an elastic modulus at 25° C. of $8.0 \times 10^6$ to $5.0 \times 10^8$ Pa, and the elastic modulus at 80° C. of said film is $8.0 \times 10^7$ Pa or less.

2. The separable fastener of claim 1, wherein the resin composition comprises an acrylic resin having a carboxyl group.

3. The separable fastener of claim 1, wherein the resin composition further comprises a water-soluble or a water-dispersible curing agent having two or more functional groups capable of reacting with one or more carboxyl groups.

4. The separable fastener of claim 2, wherein the functional groups are epoxy groups.

5. The separable fastener of claim 1, wherein the resin composition comprises an acrylic resin and a weight ratio of the polyurethane resin to the acrylic resin is from 20:80 to 100:0.

6. The separable fastener of claim 1, wherein the macromolecular polyol is at least one polyol having a molecular weight of 500 to 3000 selected from the group consisting of polyether diols, polyester diols, polycarbonate diols and polyester carbonate diols.

7. The separable fastener of claim 1, wherein a carboxyl group content of the polyurethane resin is from 20 to 60 mmol per 100 g of resin.

8. The separable fastener of claim 1, wherein the polyurethane resin further comprises a compound having a plasticizing effect on the polyurethane resin.

9. The separable fastener of claim 8, wherein the plasticizing compound is ethylenedibromide-4,4'-isopropylidene bis(2,6-dibromophenol) condensate.

10. The separable fastener of claim 8, wherein the plasticizing compound is present in an amount of from 0 to 50 parts by weight based on 100 parts of the polyurethane resin.

11. The separable fastener of claim 3, wherein a weight ratio of the resin to the curing agent is from 10:1 to 100:20 in terms of effective components.

12. The separable fastener of claim 1, wherein an average dispersion particle diameter of the aqueous dispersion of a polyurethane resin is 500 nm or less, and the average dispersion particle diameter of an aqueous dispersion of an acrylic resin is 1 μm or less and is at least 1.2 times that of the aqueous dispersion of a polyurethane resin.

13. The separable fastener of claim 1, wherein the at least one macromolecular polyol is selected from the group consisting of polyethylene glycol, polypropylene glycol, polytetramethylene glycol, poly (methyltetramethylene glycol), polybutylene adipate diol, polybutylene sebacate diol, poly hexamethylene adipate diol, poly (3-methyl- 1,5 -pentylene adipate) diol, poly(3 -methyl-i ,5-pentylene sebacate) diol, polycaprolactone diol, poly(β-methyl-δ-valerolactone) diol, polyhexamethylene carbonate diol and poly(3-methyl-1,5-pentylene carbonate) diol.

14. The separable fastener of claim 1, wherein the organic polyisocyanate is selected from the group consisting of alicyclic diisocyanates, aliphatic diisocyanates and aromatic diisocyanates having a molecular weight not exceeding 500.

15. The separable fastener of claim 1, wherein the chain extending agent has a molecular weight of less than 300 and comprises at least two active hydrogen atoms.

16. The separable fastener of claim 1, wherein a molar ratio of the macromolecular polyol and the chain extending agent is from 1:0.5 to 1:20.

17. The separable fastener of claim 1, wherein a molar ratio of the macromolecular polyol and the organic polyisocyanate is from 1:2 to 1:9.

18. The separable fastener of claim 1, wherein a molar ratio of the organic polyisocyanate to the chain extending agent is from 1:0.1 to 1:0.9.

19. The separable fastener of claim 1, wherein the aqueous dispersion is obtained by reacting at least one macromolecular polyol, at least one organic polyisocyanate, a chain extending agent, 2,2-dimethylolbutanoic acid and a tertiary amine.

20. The separable fastener of claim 19, wherein the tertiary amine is reacted in an amount of from 0.3 to 1.5 times the number of carboxyl groups in the polyurethane resin.

21. The separable fastener of claim 1, comprising a base fabric having at least one of a plurality of hook-shaped catches or a plurality of mushroom-shaped projections and a sheet having a plurality of loop-shaped connectors.

22. A method of manufacturing the separable fastener of claim 1, comprising coating the aqueous resin composition on a back surface of the separable fastener, wherein said separable fastener comprises a plurality of synthetic fibers and drying, heat treating or both drying and heat treating the separable fastener.

23. The method of claim 22, wherein the drying, heat treating or both are performed for a time and at a temperature satisfying the following relation (1):

$$t \times 0.5^{-T/10} \geq 1000, \quad 40 \leq T \leq 200 \qquad (1)$$

where T is the drying and heat treatment temperature (°C.), and t is the drying and heat treatment time (hr).

24. A separable fastener obtained by the manufacturing method of claim 22.

25. A separable fastener obtained by the manufacturing method of claim 23.

26. The separable fastener of claim 1, wherein the aqueous dispersion of the polyurethane resin is obtained by reacting isophorone diisocyanate, 2,2-dimethylbutanoic acid, a polytetramethylene glycol, and a piperazine chain extending agent.

27. The separable fastener of claim 26, wherein the separable fastener has a greater resistance to chlorine bleaching agents than a separable fastener made with 2,2-dimethylol propionic acid.

* * * * *